United States Patent
Summer et al.

(10) Patent No.: US 8,636,452 B2
(45) Date of Patent: Jan. 28, 2014

(54) METHOD FOR USING A BICYCLE TIRE INNER TUBE TO MAKE A TIE DOWN STRAP

(76) Inventors: John D. Summer, Portland, OR (US); Erik Bodegom, Portland, OR (US)

( * ) Notice: Subject to any disclaimer, the term of this patent is extended or adjusted under 35 U.S.C. 154(b) by 0 days.

(21) Appl. No.: 13/316,947

(22) Filed: Dec. 12, 2011

(65) Prior Publication Data

US 2012/0148363 A1    Jun. 14, 2012

Related U.S. Application Data

(60) Provisional application No. 61/459,401, filed on Dec. 13, 2010.

(51) Int. Cl.
*B61D 45/00* (2006.01)
(52) U.S. Cl.
USPC .......................................................... 410/101
(58) Field of Classification Search
USPC .............. 410/101; 24/572.1, 584.1, 586.1, 24/586.11, 587.1, 587.12, 588.1, 589.1, 24/591.1, 592.1, 593.1, 594.1, 594.11, 24/596.1, 598.1
See application file for complete search history.

(56) References Cited

U.S. PATENT DOCUMENTS

|  |  |  |  |  |
|---|---|---|---|---|
| 216,096 | A * | 6/1879 | Moore | 24/21 |
| 554,127 | A * | 2/1896 | Jablonsky | 24/21 |
| 569,767 | A * | 10/1896 | Quereau | 24/588.1 |
| 1,249,959 | A * | 12/1917 | Hodges | 24/589.1 |
| 3,350,752 | A * | 11/1967 | Plummer | 24/584.1 |
| 3,520,033 | A * | 7/1970 | Usuda | 24/590.1 |
| 3,530,546 | A * | 9/1970 | Ferrando | 24/312 |
| 3,765,062 | A * | 10/1973 | Cruse | 24/587.12 |
| 3,799,610 | A * | 3/1974 | Hollins | 297/468 |
| 4,052,774 | A * | 10/1977 | Noda | 24/587.12 |
| 4,413,383 | A * | 11/1983 | Spalding | 24/164 |
| 4,520,813 | A * | 6/1985 | Young | 128/207.17 |
| 5,224,247 | A * | 7/1993 | Collier | 24/587.12 |
| 6,499,201 | B2 * | 12/2002 | Fildan et al. | 24/586.11 |
| 6,859,982 | B1 * | 3/2005 | Carrillo | 24/584.1 |
| 8,001,662 | B1 * | 8/2011 | Guber | 24/319 |
| 8,225,468 | B2 * | 7/2012 | Wanzenboeck | 24/586.11 |
| 2012/0038200 | A1 * | 2/2012 | Stankiewicz et al. | 297/452.59 |
| 2012/0042481 | A1 * | 2/2012 | Kempf | 24/116 R |

* cited by examiner

*Primary Examiner* — H Gutman
(74) *Attorney, Agent, or Firm* — Klarquist Sparkman, LLP

(57) ABSTRACT

A tie down strap is used for securing cargo or to attach various objects. A tie down strap is made from a bicycle tire inner tube and clips which can be removeably and adjustably attached to either end of the bicycle tire inner tube which is cut along a radial axis.

12 Claims, 8 Drawing Sheets

METHOD FOR USING A BICYCLE TIRE INNER TUBE TO MAKE A TIE DOWN STRAP

RELATED APPLICATIONS

This patent application claims the priority date of provisional patent application 61/459,401, filing date Dec. 13, 2010 entitled "METHOD FOR USING A BICYCLE INNER TUBE TO MAKE A TIE DOWN STRAP."

FIELD OF THE INVENTION

The present invention relates generally to a method for making an adjustable tie down strap.

BACKGROUND OF THE INVENTION

Generally elastomeric cords used to tie down cargo or attach various objects are comprised of so-called bungee cords which include a length of pre-fabricated elastic cord with a hook made from a bent metal rod permanently secured to both ends. The metal hooks create the danger of scratching painted or finished surfaces as well as the danger of injuring a person's eye if they come loose and snap back. In addition, bungee cords are not long enough so stretch around an automobile from front to back or even from side to side, so they cannot be used to strap cargo to a car or truck. A long bungee cord would be expensive because of the cost of a long pre-fabricated elastomeric cord. Bungee cords are not easily attached to themselves to form a loop, because they do not lock together in a manner which prevents disengagement when the bias from the elastomeric cord is released. Finally the length of a typical bungee cord is not adjustable because the hooks are permanently fixed to the ends of the elastomeric cord. Therefore there is a need for an elastomeric strap which is adjustable in length, can be used over long distances, such as between front and rear bumpers of a car, and has ends which do not present dangers of scratching finished surfaces or injuring eyes.

SUMMARY OF THE INVENTION

The present invention solves the problems in prior art elastomeric straps by providing a pair of clips which can be removeably and adjustably attached to a bicycle tire inner tube and which also can be locked to each other. Bicycle tire inner tubes are relatively long and can be stretched to about three times their relaxed length. They also have no cost and are readily available, because they are generally discarded when they develop an air leak and cause a flat tire on a bicycle. The clips which are attached to the bicycle tire inner tubes in the present invention are preferably made of plastic so they will not scratch a surface to which they are attached, and their ends are rounded so they do not present the danger of injuring a person's eye if they break or come loose. Each clip has one end portion comprised of a planar surface which includes a pair of slots formed therethrough for securing the bicycle tire inner tube so that the bicycle tire inner tube can be slid through the slots to create a functioning strap of an adjustable length. Each clip also has a second end portion comprised of an engaging means for engaging surfaces such as a grommet, an edge of an automobile body, a metal rod, a right angle such as a corner of a garage or other building, or another clip. The second end portion may comprise a hook or J shape which is substantially in the same plane as the first end portion. Alternatively, the second end portion may comprise an area which has been bent into a U-shape or S-shape which allows two clips to be locked together so that a single strap of the present invention can have its two ends locked together to form a loop, and so multiple straps of the present invention can be attached in sequence to create one very long elastomeric strap. The U-shape or S-shape embodiments may include a lug that can be used to engage a structure such as a grommet in a tarpaulin and which fits into a corresponding opening on another clip when two clips are locked together. A method is described for manufacturing clips of the U-shape or S-shape embodiments in sheets.

DETAILED DESCRIPTION OF THE PREFERRED EMBODIMENT

Figure 1:
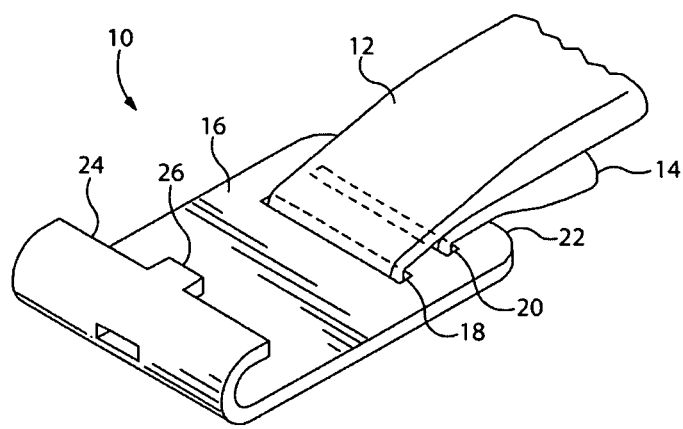
FIG. 1 is a partial perspective view of a first device constructed in accordance with the present invention.

Indicated generally at 10 in FIG. 1 is a device constructed in accordance with the present invention. The device includes a commercially available bicycle tire inner tube 12 that has been cut along a radial axis to create a first end 14 and a second end 15 (in FIG. 4). Device 10 also includes a first clip 16 and a second clip 17 (in FIG. 4) that are substantially identical to one another. Clip 16 includes a pair of parallel slots 18, 20 (shown partially in dashed-line configuration) formed therethrough. Slots 18 and 20 are formed adjacent a first end 22 of the clip. The end 14 of bicycle tire inner tube 12 is frictionally engaged with clip 16 by threading it through slots 18 and 20 as shown.

Although the inner tube engaging openings in the illustrated embodiment are slots, many other types of openings could serve the purpose of frictionally engaging the bicycle tire inner tube well enough to prevent slipping in response to tensile forces while also allowing the user to adjust the effective length of the resulting elastomeric strap by sliding the bicycle tire inner tube through the openings. For example, tapered slots could allow for very quick adjustment. Similarly, either one or both of the slots might have one open end to facilitate inserting and adjusting the bicycle tire inner tube. Although the slots in the illustrated embodiments are shown parallel, it is to be understood that the slots do not have to be parallel to one another. Although the illustrated embodiments are made of plastic other materials might be employed as well.

Figure 2:
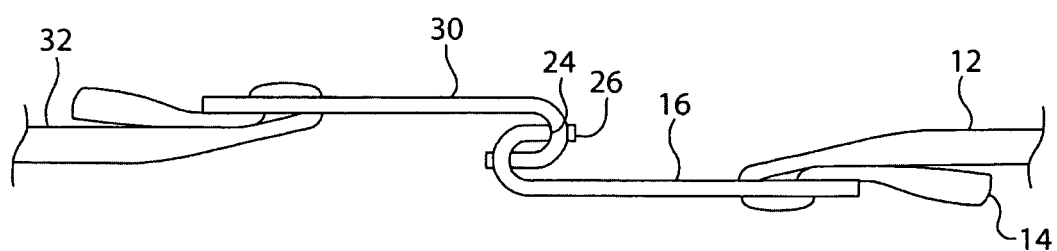
FIG. 2 is a side elevation view of the FIG. 1 device hooked together with another substantially identical device.
Figure 3:
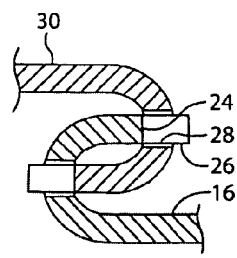
FIG. 3 is an enlarged sectional view of a portion of the devices shown in FIG. 2.

A U-shaped cross section is shown adjacent a second end 24 of the clip, as shown more clearly in FIG. 3. A lug 26 extends from end 24 of the clip and a rectangular opening 28 is formed through a second clip 30, in FIGS. 2 and 3. The dimensions of opening 28 are slightly wider and higher than lug 26, as viewed from end 24. This permits engagement of a pair of clips, such as clip 16 and clip 30—which is substantially identical to clip 16—as shown in FIGS. 2 and 3. The lugs on each of the clips, like lug 26 on clip 16, are also well suited for hooking through a round opening, for example, a grommet on a tarpaulin. In FIG. 2 a bicycle tire inner tube 32 is engaged with slots, such as slots 18 and 20 in clip 16, in the same manner as the bicycle tire inner tube is connected to the other clips.

Figure 4:
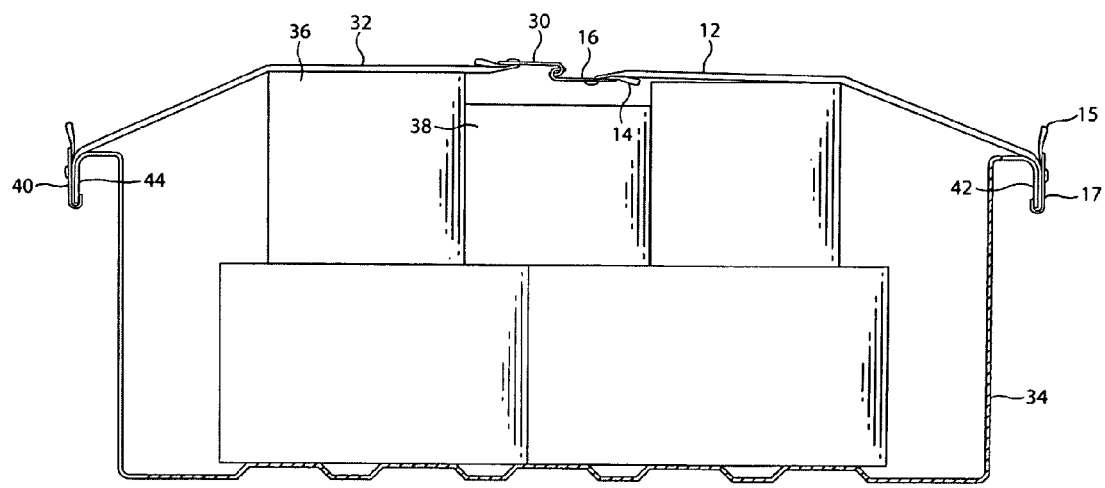
FIG. 4 is a cross-sectional end view of the bed of a pickup truck in which two devices of the present invention are hooked together as shown in FIG. 2 to secure a load of cargo in the bed of the truck.

In FIG. 4, boxes such as 36 and 38 comprise a load in a pickup truck bed 34. Clips 16 and 30 are hooked together near the middle of the load as depicted in FIGS. 2 and 3 to create a device which includes two bicycle tire inner tubes linked in series. The other end of inner tube 32 includes another clip 40, secured thereto in the same fashion as each of the other clips. Each of clips 17 and 40 are hooked over a downward-projecting metal potion 42, 44, correspondingly, on opposite sides of the truck bed. The clips are well suited for hooking onto the edges of metal, like the sheet metal edges found on the edges of car bodies, the rain gutters found on the edges of car roofs, or car bumpers.

Figure 5:
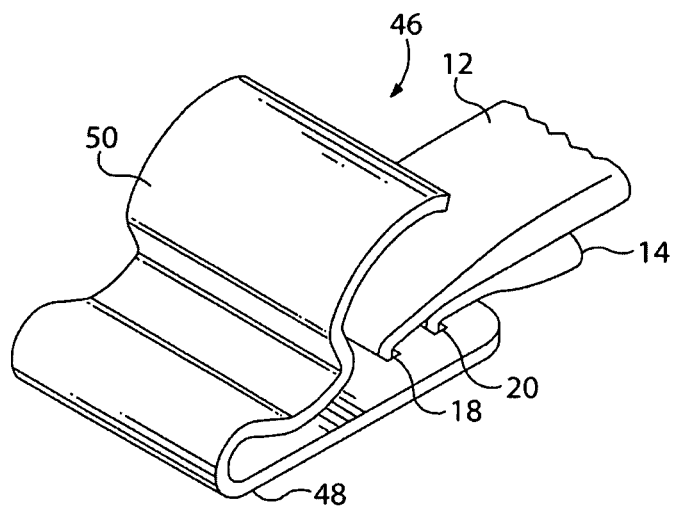
FIG. 5 is a partial perspective view of a second device constructed in accordance with the present invention.
Figure 6A:
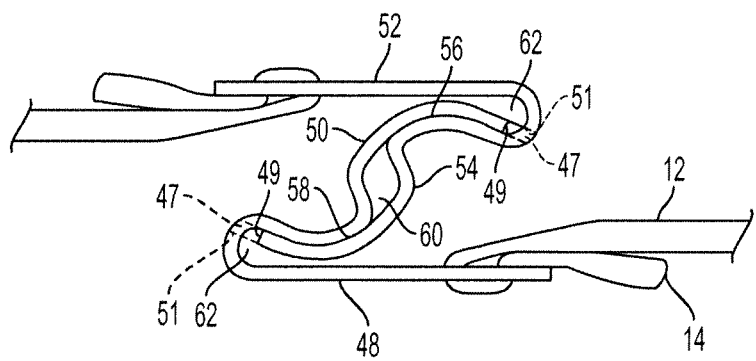
FIG. 6A is a side elevation view of the FIG. 5A device hooked together with another substantially identical FIG. 5A device.
Figure 6:
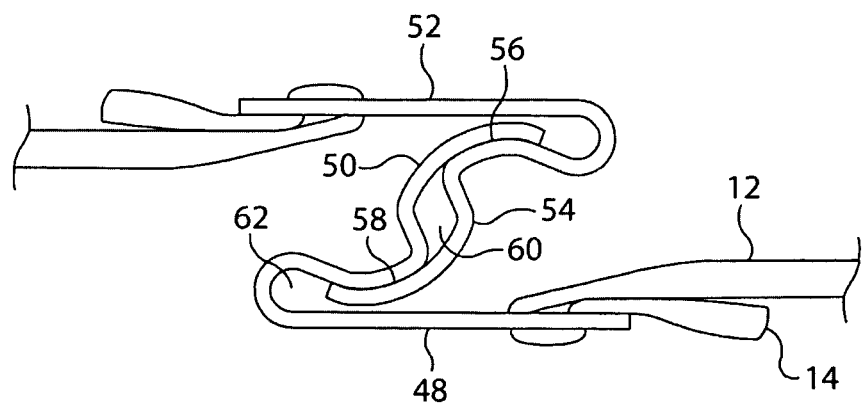
FIG. 6 is a side elevation view of the FIG. 5 device hooked together with another substantially identical device.

In FIGS. 5 and 6, a second device 46 is also constructed in accordance with the present invention. Device 46 includes a clip 48 having an S-shaped portion 50. In FIG. 6, a second clip 52, which is substantially identical to clip 48, also includes an S-shaped portion 54. S- shaped portions 54 and 50 have a resiliency due to the sharp curve by which the S-shaped portions are connected with the planar surfaces containing parallel slots such as 18, 20 shown in FIGS. 1 and 5. Because of that resiliency, when engaged as shown in FIG. 6, boundaries 56 and 58 between the corresponding S-shaped portions snap the convex portions of the S-shaped portions which engage them and thereby lock together, engaging the clips with one another. An opening 60, defined between boundaries 56 and 58, provides an area in which a screwdriver or the like may be inserted and twisted to force clips 48 and 52 apart when it is desired to unlock them. The clips shown in FIGS. 5 and 6 can be connected to bicycle tire inner tubes as illustrated in FIGS. 1 and 2 and also attached to a truck body in the same fashion as shown in FIG. 4. When clipped over metal portions on the pickup truck bed, like portions 42 and 44, the clip of FIG. 5 is hooked over the metal portion until the outermost end of the metal portion is received within space 62 of clip 48.

Although the clips in this second illustrated embodiment do not contain lugs and the corresponding openings as in the first described embodiment, it is to be understood that the lugs and openings in which the lugs fit could be included in the second embodiment with S-shaped clips as well as in the first embodiment with U-shaped clips.

Figure 5A:
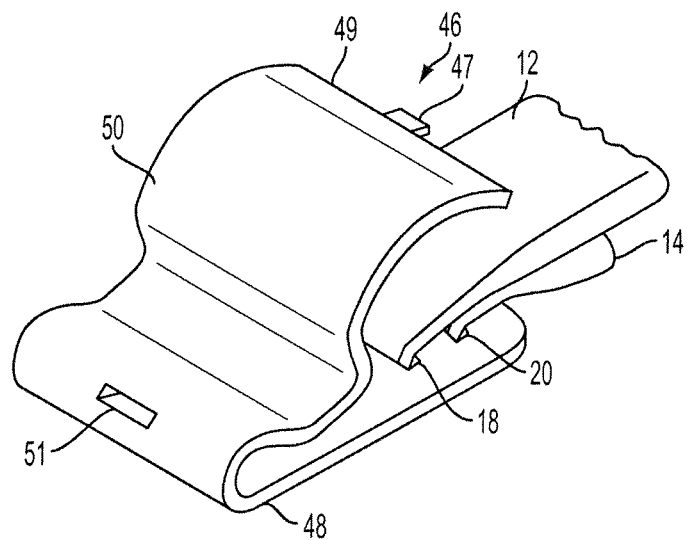
FIG. 5A is a partial perspective view of a device similar to FIG. 5 except including a lug and lug receiving slot.

FIGS. 5A and 6A illustrate the embodiments of FIGS. 5 and 6 with clips that have respective lugs 47 that are positioned within respective lug receiving openings 51 when the clips are hooked together as shown in FIG. 6A. Like the embodiment of FIG. 1, the lug 47 is shown projecting from the edge 49 of the clip in a direction toward the tube portion 12.

Figure 7:
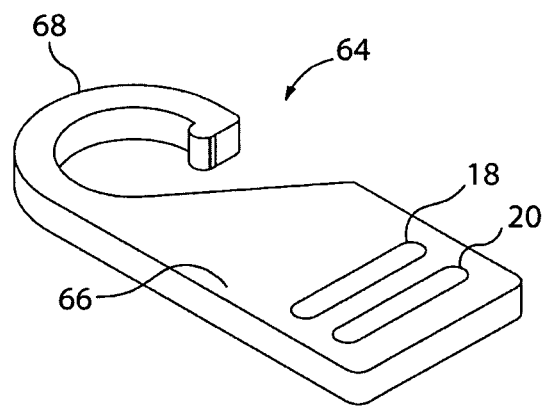
FIG. 7 is a partial perspective view of a third device constructed in accordance with the present invention.
Figure 8:
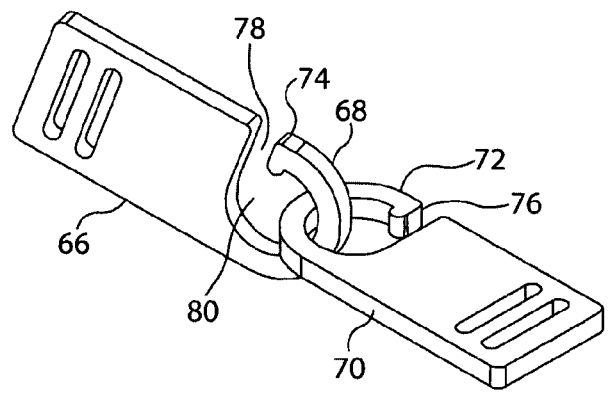
FIG. 8 is a side elevation view of the FIG. 7 device hooked together with another substantially identical device.

In FIGS. 7 and 8, a third embodiment 64 is constructed in accordance with the present invention. Device 64 includes a clip 66 having a J-shaped portion 68 that is substantially in the plane of the clip 66. In FIG. 8, a second clip 70, which is substantially identical to clip 66, also includes a J-shaped portion 72. The J-shaped portions 72 and 68 are small enough to engage a grommet on a tarpaulin and are also shaped to engage a framework such as a rod, shaft, or sheet metal edge. The clips shown in FIGS. 7 and 8 can be connected to the bicycle tire inner tubes as shown in FIGS. 1 and 2 and attached to a truck body in the same fashion as shown in FIG. 4. When clipped over metal portions on the pickup truck bed, like portions 42 and 44, the clip of FIG. 7 is hooked over the metal portion until the outermost end of the metal portion is received within space 80 of clip 66.

Figure 9:
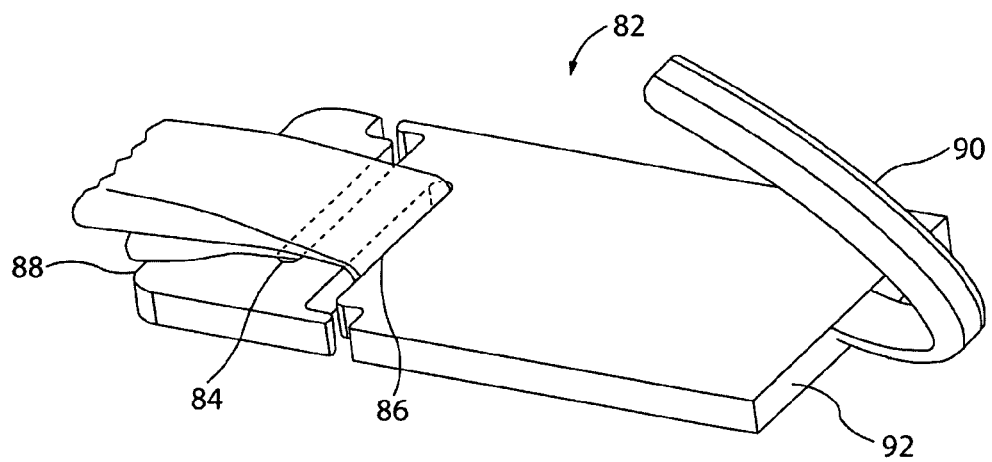
FIG. 9 is a partial perspective view of a fourth device constructed in accordance with the present invention.

In FIG. 9, a fourth clip embodiment 82 is also constructed in accordance with the present invention. Clip 82 includes a pair of modified parallel slots 84, 86 formed therethrough. Slots 84 and 86 are formed adjacent a first end 88 of the clip. These slots are open on one end to facilitate engaging the bicycle tire inner tube by threading it through slots 84 and 86. The J-shaped end portion 90 extends from end 92 of the clip and connects with a similar opening in a second clip.

Figure 10:
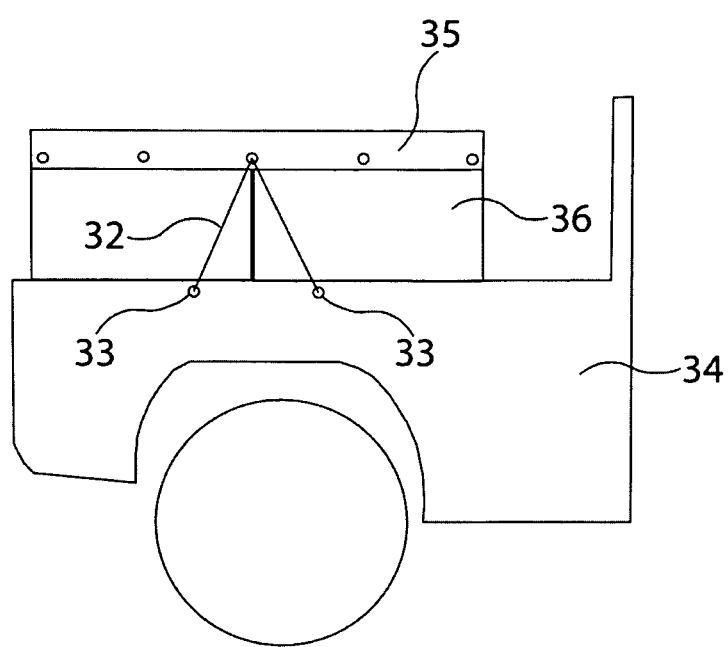
FIG. 10 is a side view of the current invention to use it to attach a tarpaulin to the side of a pickup truck in which three devices of the present invention are used.

In FIG. 10, three identical clips of this fourth embodiment are used with a single bicycle tire inner tube to secure a tarpaulin 35 over a load such as a load in a pick-up truck bed 34. The J-shaped end portions of the clips which are attached to the ends of the bicycle tire inner tube 32 are attached to projections 33 of the pick-up truck bed 34. The J-shaped end portion of the clip which is located in the middle portion of the bicycle tire inner tube 32 engages a grommet in the tarpaulin 35 and thereby hold it down.

Figure 11:
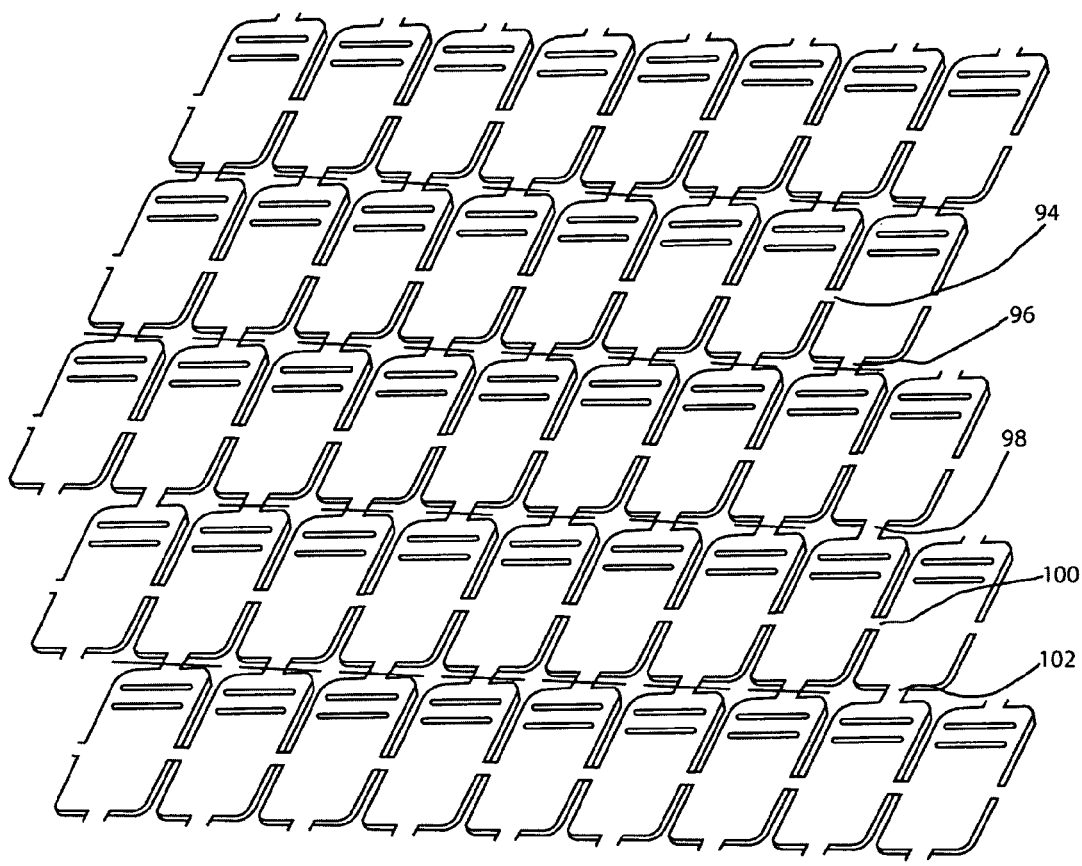
FIG. 11 is a side elevation view of a sheet of plastic which has been cut for manufacturing clips.

The clips of these embodiments may be manufactured by cutting and then bending sheets of plastic such as ¼ inch thick nylon. Plastics which are relatively heat resistant are preferred so that the clips do not soften too much in heat and direct sunlight. FIG. 11 shows one of those sheets after having been cut out leaving rows of panels, which will later be bent and cut out to form the finished clips. The clips in the sheet are tabbed together at areas such as 94, 96, 98, 100, and 102 to facilitate handling of the sheets. In the next stage of manufacturing, the sheets are bent with a hinging action of one mold portion (the swinging portion) against a fixed second mold. Because of the shape of the clip, a hinging mold is particularly easy to remove from the product after it cools. The swinging first mold and/or the fixed second mold may contain sharpened areas to cut the tabs between adjacent parts while bending the parts.

Having illustrated and described the principles of our invention in a preferred embodiment thereof, it should be readily apparent to those skilled in the art that the invention can be modified in arrangement and detail without departing from such principles.

We claim:

1. A method for fabricating an elastomeric strap, said method comprising; providing a bicycle tire inner tube which has been cut substantially along a radial axis so that said bicycle tire inner tube has a first end and a second end, and attaching substantially identical clips to said first and second ends, each of said clips comprising a first portion having at least two slots formed therethrough, said slots being sized such that the end of the bicycle tire inner tube can be threaded sequentially through the slots to secure the end of the bicycle tire inner tube to the clip, and a curved engaging member integrally formed with said first portion, the curved engaging member comprising a portion with an S-shaped cross section positioned to overlie a portion of the first portion when the clip is oriented with the portion with the S-shaped cross section positioned above the first portion.

2. The method of claim 1 wherein the S-shaped curved engaging member of each clip defines a boundary on its inner surface overlying a portion of the first portion of said each clip and wherein said boundaries of two substantially identical clips lock together and thereby engage the clips.

3. The method of claim 1 wherein each clip comprises a bend portion from which the portion with the S-shaped cross section extends, a lug receiving opening in the bend portion of each of said clip members and a lug extending from the end of the curved engaging member of each of said clip members, wherein said lug receiving opening is slightly wider and higher than the lug, wherein the lug of the second clip member is receivable through the lug receiving opening of the first clip member and the lug of the first clip member is receivable through the lug receiving opening of the second clip member.

4. The method of claim 3 wherein each clip has respective first and second sides and terminates in an end spaced from the first portion, and wherein each lug projects outwardly beyond the end from a location spaced from the respective sides of the clip.

5. The method of claim 1 wherein the location at which the clips are engaged on the bicycle tire inner tube can be adjusted by sliding the bicycle tire inner tube through the slots.

6. A method for fabricating an elastomeric strap, said method comprising; providing a bicycle tire inner tube which has been cut substantially along a radial axis so that said bicycle tire inner tube has a first end and a second end, and attaching substantially identical clips to said first and second ends, each of said clips comprising a flat portion having at least two slots formed therethrough, said slots being sized such that the end of the bicycle tire inner tube can be threaded sequentially through the slots to secure the end of the bicycle tire inner tube to the clip, and a curved engaging member integrally formed with said flat portion; wherein the curved engaging member has an S-shaped cross section; wherein the S-shaped curved engaging member of each clip defines a boundary on its inner surface and wherein said boundaries of two substantially identical clips lock together and thereby engage the clips; and wherein an opening defined between said boundaries provides an area in which a screw driver or other tool can be inserted and then shifted to force said clips apart when it is desired to unlock them.

7. A method for using a bicycle tire inner tube for tying down a load, said method comprising cutting the bicycle tire inner tube substantially along a radial axis, attaching a first clip to a first end of the tube by engaging said bicycle tire inner tube within slots located in said first clip, and attaching a second substantially identical second clip to the second end by engaging said bicycle tire inner tube within slots located in said second clip, wherein each clip comprises a first end portion which comprises a flat area in which the slots are formed therethrough and a second end portion above the first end portion that comprises a curved engaging area by which the clips engage each other; and wherein said curved engaging member has an S-shaped cross section.

8. The method of claim 7 wherein a rectangular opening is formed in each of said clip members and a lug is formed extending from the end of the curved engaging member of said clip members,
   wherein said opening is slightly wider and higher than the lug, wherein the lug of the second clip member is receivable through the opening of the first clip member and the lug of the first clip member is receivable through the opening of the second clip member.

9. The method of claim 7 wherein a third substantially identical clip is engaged along a portion of said bicycle tire inner tube and wherein each of the clips comprises a curved engaging area.

10. The method of claim 7 wherein each clip contains a first end portion which comprises a flat area in which the slots are formed therethrough and a second end portion which comprises a curved engaging area.

11. The method of claim 7 wherein a third substantially identical clip is attached to said bicycle tire inner tube by engaging said bicycle tire inner tube within slots located in said third clip.

12. A method for using a bicycle tire inner tube for tying down a load, said method comprising cutting the bicycle tire inner tube substantially along a radial axis, attaching a first clip to a first end of the tube by engaging said bicycle tire inner tube within slots located in said first clip, and attaching a second substantially identical second clip to the second end by engaging said bicycle tire inner tube within slots located in said second clip, wherein said curved engaging member has an S-shaped cross section, and wherein the S-shaped curved engaging members of the clips each defines a boundary on its inner surface and wherein said boundaries lock together and thereby engage the clips and wherein an opening defined between said boundaries provides an area in which a screw driver or other tool can be inserted and twisted to force said clips apart when it is desired to unlock them.

\* \* \* \* \*